(12) United States Patent
Tsai et al.

(10) Patent No.: US 9,417,721 B2
(45) Date of Patent: Aug. 16, 2016

(54) TFT TOUCH DISPLAY DEVICE AND DRIVING METHOD THEREOF

(71) Applicant: InnoLux Corporation, Miao-Li County (TW)

(72) Inventors: Yu-Cheng Tsai, Miao-Li County (TW); Tsau-Hua Hsieh, Miao-Li County (TW); Chao-Liang Lu, Miao-Li County (TW); Jian-Jung Shih, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 175 days.

(21) Appl. No.: 14/044,917

(22) Filed: Oct. 3, 2013

(65) Prior Publication Data

US 2014/0098044 A1    Apr. 10, 2014

(30) Foreign Application Priority Data

Oct. 5, 2012   (TW) .............................. 101136829 A

(51) Int. Cl.
*G06F 3/041* (2006.01)
*G06F 3/042* (2006.01)

(52) U.S. Cl.
CPC ................ *G06F 3/041* (2013.01); *G06F 3/042* (2013.01)

(58) Field of Classification Search
CPC ................................ G06F 3/041–3/048; G06F 2203/041–2203/04113
See application file for complete search history.

(56) References Cited

U.S. PATENT DOCUMENTS

| | | | |
|---|---|---|---|
| 8,878,790 B2* | 11/2014 | Abele .................. | G06K 9/0002 257/254 |
| 2007/0285365 A1* | 12/2007 | Lee ................................. | 345/87 |
| 2012/0026132 A1* | 2/2012 | Hotelling et al. .............. | 345/174 |
| 2013/0069894 A1* | 3/2013 | Chen et al. ..................... | 345/173 |
| 2013/0141343 A1* | 6/2013 | Yu ........................... | G06F 3/044 345/173 |
| 2013/0147730 A1* | 6/2013 | Chien et al. ................... | 345/173 |

\* cited by examiner

*Primary Examiner* — Priyank Shah
(74) *Attorney, Agent, or Firm* — Bacon & Thomas, PLLC

(57) ABSTRACT

A TFT touch display device includes a plurality of mutually vertical control lines and sensor lines and a plurality of TFTs. Each TFT is disposed at an intersection of one of the plurality of control line and one of the plurality of sensor line. The TFT is connected to a corresponding control line, a corresponding sensor line, and a power source. When there is an object approaching to the TFT, the TFT is turned on and a back-channel current is generated. A control unit is connected to the plurality of control lines to respectively provide a control signal to the plurality of control lines. A current sensing unit is connected to the plurality of sensor lines to respectively sense a current generated by the TFTs.

16 Claims, 10 Drawing Sheets

# TFT TOUCH DISPLAY DEVICE AND DRIVING METHOD THEREOF

BACKGROUND OF THE INVENTION

1. Field of the Invention

The present invention relates to the technical field of touch panels and, more particularly, to a thin film transistor (TFT) touch display device and driving method thereof.

2. Description of Related Art

The prior plug-in touch panel is formed of at least three sheets of glass including TFT liquid crystal display (TFT LCD) panel and touch sensor glass, so that the weight is heavy and cannot meet with the lightweight requirement of product.

In addition, on the design of combining the LCD panel and the touch sensor, the transmittance on the LCD panel is reduced when a transparent conductive layer is used as the touch electrode, and the aperture rate is reduced when an opaque conductive layer is used.

Therefore, it is desirable to provide an improved TFT touch display device and driving method to mitigate and/or obviate the aforementioned problems.

SUMMARY OF THE INVENTION

It is one object of the present disclosure to provide a TFT touch display device and driving method thereof, which can effectively increase the accuracy of sensing the touch location.

It is another object of the disclosure to provide a TFT touch display device and driving method thereof, which can use the thin film transistors on a prior liquid crystal display panel to sense the touch without increasing the hardware cost.

It is a further object of the disclosure to provide a TFT touch display device and driving method thereof, which can overcome the low touch resolution in the prior art.

According to a feature of the disclosure, there is provided a TFT touch display device, which includes a plurality of control lines distributed along a first direction; a plurality of sensor lines distributed along a second direction substantially vertical to the first direction; a plurality of TFTs, each being disposed at an intersection of a control line and a sensor line, wherein each TFT is connected to the control line, the sensor line, and a power source, such that the TFT is turned on to generate a back-channel current when there is an object approaching to the TFT; a control unit connected to the plurality of control lines for respectively providing a control signal to the plurality of control lines; and a current sensing unit connected to the plurality of sensor lines for respectively sensing the back-channel current generated by the TFTs in a sensing period.

According to another feature of the disclosure, there is provided a driving method for a TFT touch display device having a plurality of mutually vertical control lines and sensor lines and a plurality of TFTs, wherein each TFT is disposed at an intersection of a control line and a sensor line, and the TFT is connected to the control line, the sensor line, and a power source. The driving method includes: using the power source to provide a current signal to each of the thin film transistors, respectively providing a control signal to the control lines, and using the sensor lines to respectively receive a current generated by the thin film transistors in a sensing period.

Other objects, advantages, and novel features of the disclosure will become more apparent from the following detailed description when taken in conjunction with the accompanying drawings.

DETAILED DESCRIPTION OF THE PREFERRED EMBODIMENT

Figure 1:
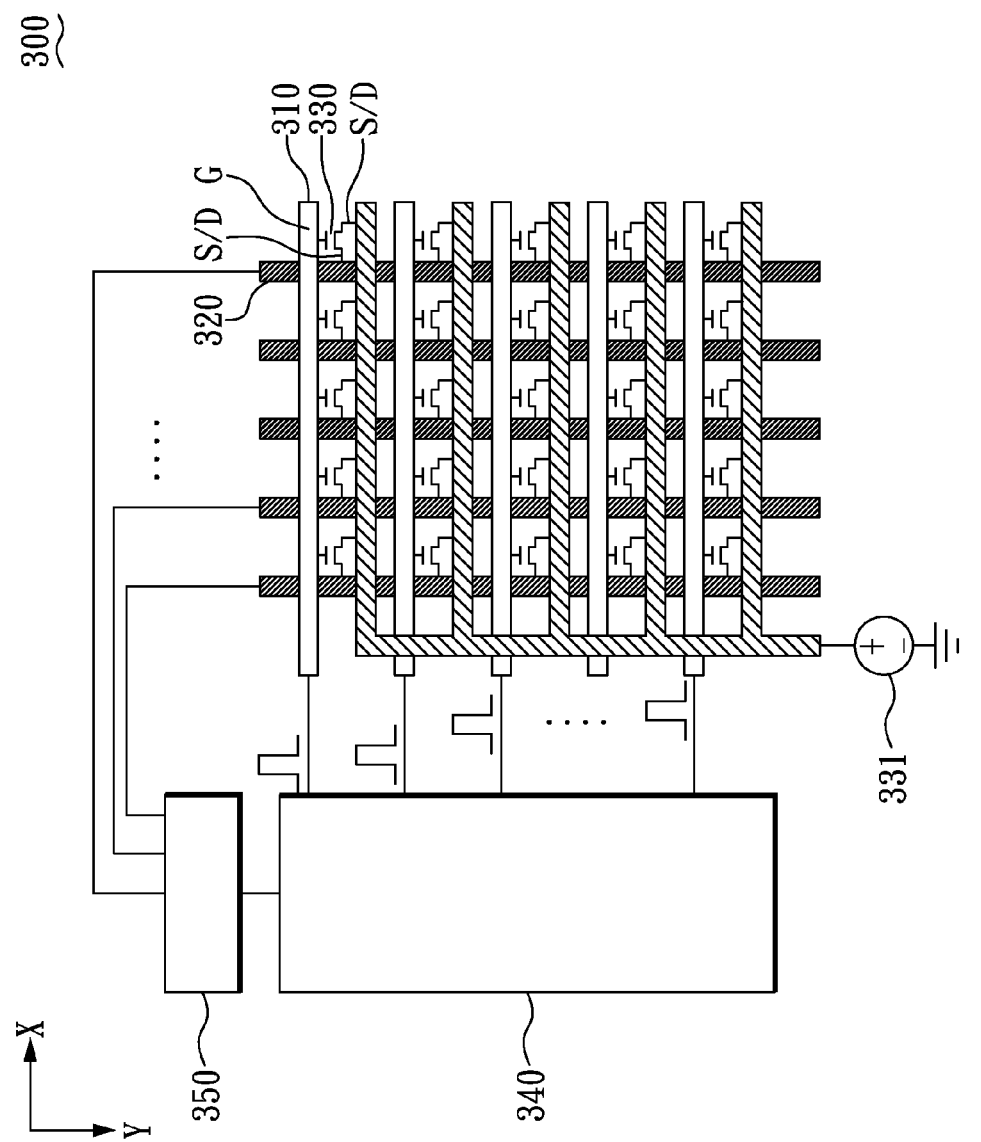
FIG. 1 is a schematic view of a thin film transistor touch display device according to the disclosure.

FIG. 1 is a schematic view of a thin film transistor (TFT) touch display device 300 according to the disclosure. The TFT touch display device 300 includes a plurality of control lines 310, a plurality of sensor lines 320, a plurality of thin film transistors (TFTs) 330, a control unit 340, a current sensing unit 350, and a driving unit (not shown).

The control lines 310 are distributed along a first direction (X direction).

The sensor lines are distributed along a second direction (Y direction). The first direction is substantially vertical to the second direction.

Each of the thin film transistors 330 is placed at the intersection of one control line 310 and one sensor line 320, wherein the thin film transistor 330 has a gate G connected to a corresponding control line 310, a first electrode (source/drain S/D) connected to a corresponding sensor line 320, and a second electrode (source/drain S/D) connected to a power source 331, such that the thin film transistor 330 is turned on to generate a current at the first electrode (source/drain S/D) when the location corresponding to the gate G is touched. The control unit 340 sequentially provides a control signal to the control lines 310 to thereby turn on the TFTs 330. Since there is a voltage difference between the power source 330 and the sensor line 320, a current is generated in the channel layer. When the location corresponding to the TFT 330 is touched, a back channel current is generated due to the back channel effect, and the current flowing through the channel layer is changed. The power source 331 can provide a DC or AC signal. The DC signal can be a fixed voltage, such as 5V or 0V.

The control unit 340 is connected to the control lines 310 in order to respectively and sequentially provide a control signal to the control line.

The current sensing unit 350 is connected to the plurality of sensor lines 320 in order to respectively and sequentially sense the current generated by the TFTs 330 at the first source/drain S/D in a sensing period.

Figures 2A, 2B:
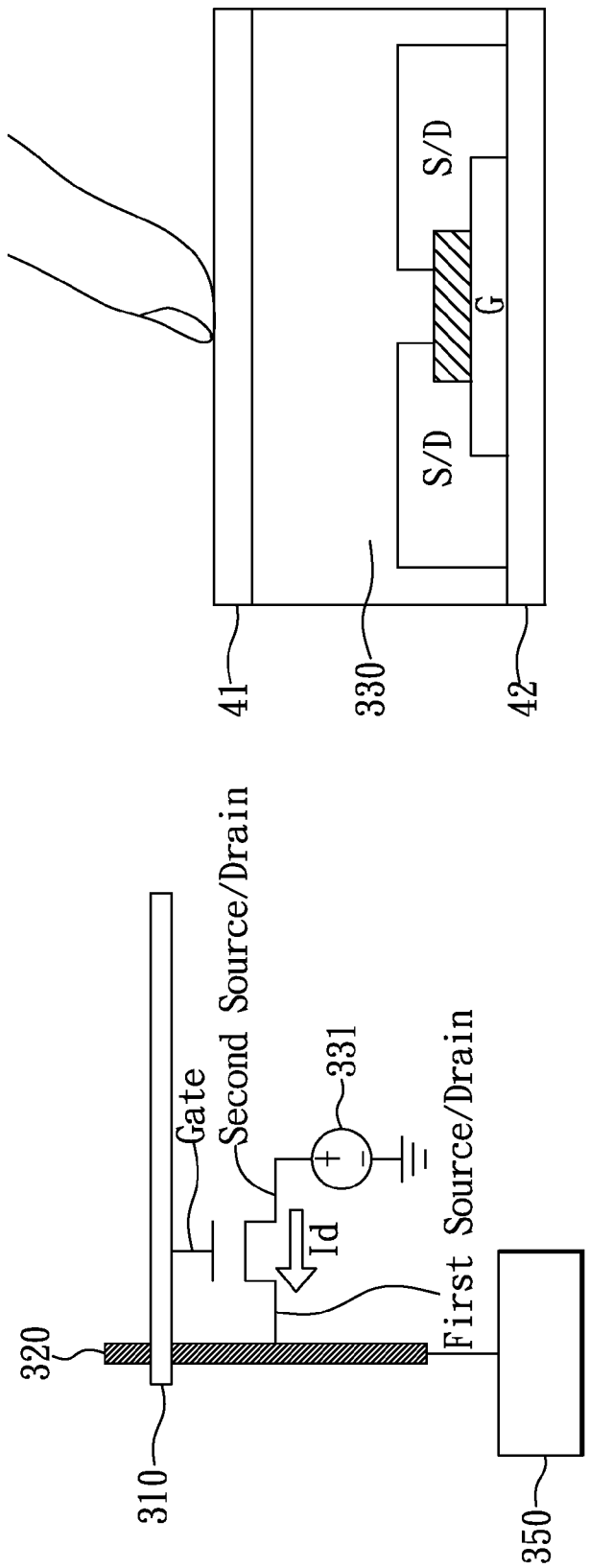
FIG. 2(A) schematically illustrates the operation of a thin film transistor according to the disclosure.
FIG. 2(B) schematically illustrates the structure of a thin film transistor according to the disclosure.

FIG. 2(A) schematically illustrates the operation of a thin film transistor 330 according to the disclosure, and FIG. 2(B) schematically illustrates the structure of a thin film transistor 330 according to the disclosure, in which the TFT 330 is placed at a location between an upper glass substrate 41 and lower glass substrate 42. As shown in FIG. 2(A), the power source 331 can provide a fixed voltage of 0V. When the signal is sent to the control line 310 to turn on the TFT, a current is generated in the channel layer due to the voltage difference between the power source 331 and the sensor line 320. When the location corresponding to the TFT is touched, the current flowing through the channel layer is changed due to the back channel effect. In this case, the current sensing unit 350 can sense the current by the sensor line 320 corresponding to the control line 310, and the control unit 340 can determine whether there is a finger approaching to the TFT 330 based on the magnitude of the current.

The current change or difference is generated because the current Id flowing through the drain and source of the TFT 330 is influenced greatly by the gate voltage when the TFT 330 is in the sub-threshold region. Accordingly, when there is a finger touching on the TFT 330, it causes the significant difference on the current Id. Therefore, the disclosure can accordingly determine whether there is a touch. Namely, while the finger touches on the location corresponding to the TFT 330, the threshold voltage Vt of the TFT 330 is changed because of the back channel effect, and it causes the difference of the current Id flowing through the drain and source of the TFT 330.

Figure 3:
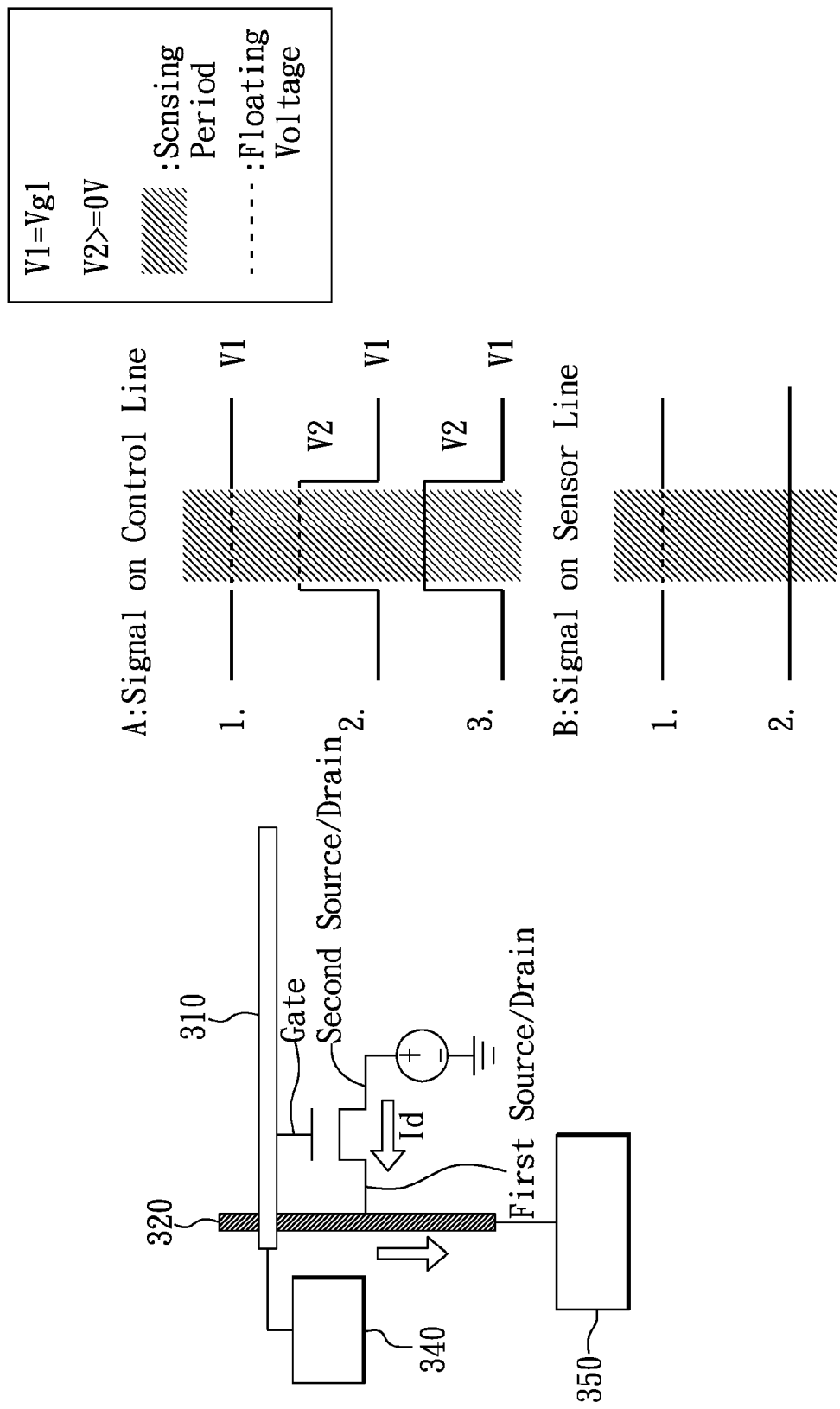
FIG. 3 is a schematic diagram of using a thin film transistor according to the disclosure.

FIG. 3 is a schematic diagram of using a thin film transistor 330 according to the disclosure. The control unit 340 provides a control signal to a control line 310. The control signal has a fixed voltage signal, and the fixed voltage signal becomes floating in the sensing period. Namely, in the sensing period, the control signal is a signal with floating voltage, and the floating voltage represents that there is no voltage applied to a gate of the TFT.

As shown in FIG. 3, for the signal on a control line, the signal with floating voltage starts with a fixed voltage V1 and periodically changes into a floating voltage at case 1; or the signal with floating voltage starts with a pull-down voltage V1 and periodically changes into a floating voltage when the pull-down voltage V1 goes up to the pull-up voltage V2 at case 2; or the signal with floating voltage starts with a pull-down voltage V1 and periodically goes up to the pull-up voltage V2 for a while and back to the pull-down voltage V1 at case 3. The pull-down voltage V1 is −7V, and the pull-up voltage V2 is 0V, for example.

As shown in FIG. 3, in the sensing period, for the signal on a sensor line, the sensor line has a floating voltage at case 1 or a fixed voltage at case 2.

The control line can be connected to one or more TFTs 330. The power source 331 is a signal source with a DC or AC signal.

Figure 4:
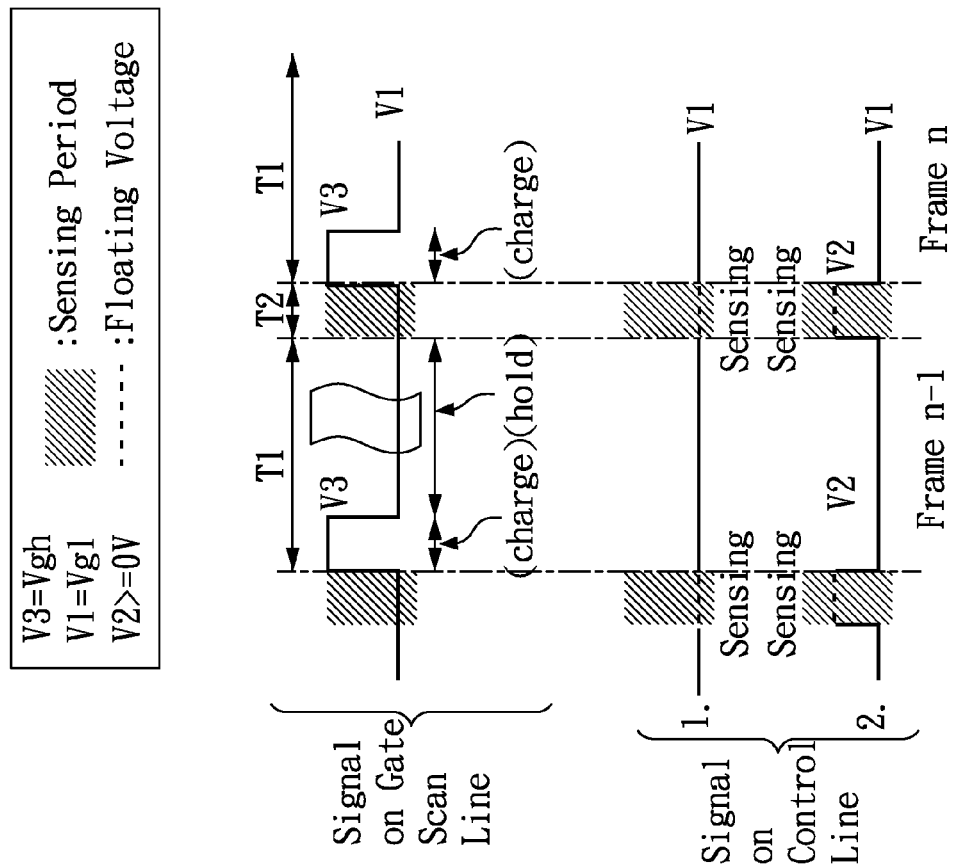
FIG. 4 is a schematic diagram of an embodiment of a thin film transistor according to the disclosure.
Figure 4:
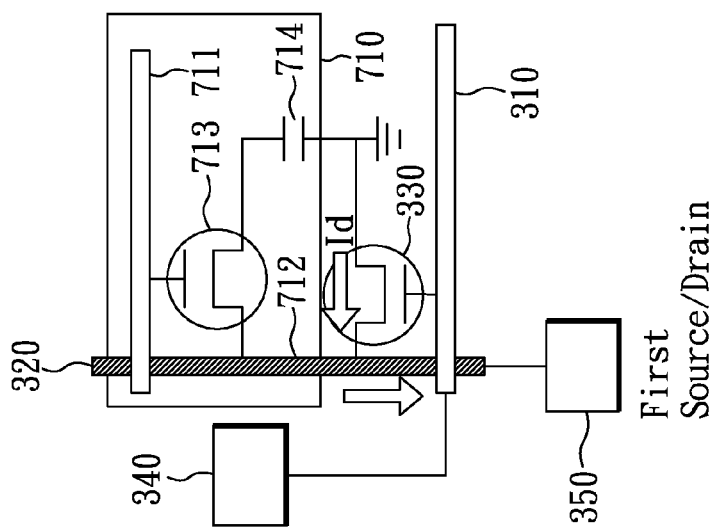

FIG. 4 is a schematic diagram of an embodiment of a thin film transistor of FIG. 1 according to the disclosure. As shown in FIG. 4, the TFT 330 is connected with a switching transistor 713 of a display pixel 710 of a display panel, where the storing capacitor 714 of the display pixel 710 is used as the power source. The display pixel 710 is formed of a scan line 711, a data line 712, the switching transistor 713, and the storing capacitor 714, which is a typical LCD pixel 710 and thus a detailed description therefor is deemed unnecessary. In this embodiment, the sensor line 320 is also used as the data line 712 of the LCD pixel 710.

As shown in FIG. 4, at the time T1, an image of the (n−1)-th frame is displayed, and at the time T2, a touch sensing is performed. In this case, when there is a line to be displayed in the time T1, the corresponding scan line 711 is pulled up to a pull-up voltage V3 from the pull-down voltage V1 in order to write the pixel data to be displayed from the data line 712 to the corresponding storing capacitor 714 (charge). Next, the corresponding scan line 711 is pulled down from the pull-up voltage V3 to the pull-down voltage V1 in order to hold the written pixel data in the storing capacitor 714 (hold). For example, the pull-up voltage V3 is Vgh which indicates a high gate voltage (Vgh) of the TFT 330. The voltage Vgh of the product on the current market is set to a voltage value ranging from 15V to 33V.

As shown in FIG. 4, the control signal includes a pull-up voltage signal and a pull-down voltage signal. The sensing period is in an interval of the pull-up voltage. Namely, there is a period of time (T2) between the (n−1)-th frame and the n-th frame that is the data blanking time and is used to perform the touch sensing. The control signal provided by the control unit 340 to each control line 310 is a signal with floating voltage. At the time T2, the signal with flowing voltage on the control line 310 is a pull-down voltage V1 in a display frame period (the time T2 of the (n−1)-th frame), and, at the pull-down voltage V1, changes into a floating voltage and then changes into the pull-down voltage V1. Alternatively, the signal with flowing voltage is a pull-down voltage V1 in a display frame period (the time T2 of the (n−1)-th frame), is pulled up to a pull-up voltage V2, changes to a floating voltage from the pull-up voltage V2, changes to the pull-up voltage V2 from the floating voltage, and returns back to the pull-down voltage V1.

In this embodiment, the data blanking time between the frame display periods is used to perform the touch sensing. In the sensing period, it can activate a plurality of control lines 310 (such as five lines) to meet with a magnitude of the current of the current sensing unit without affecting the display frame.

Figure 5:
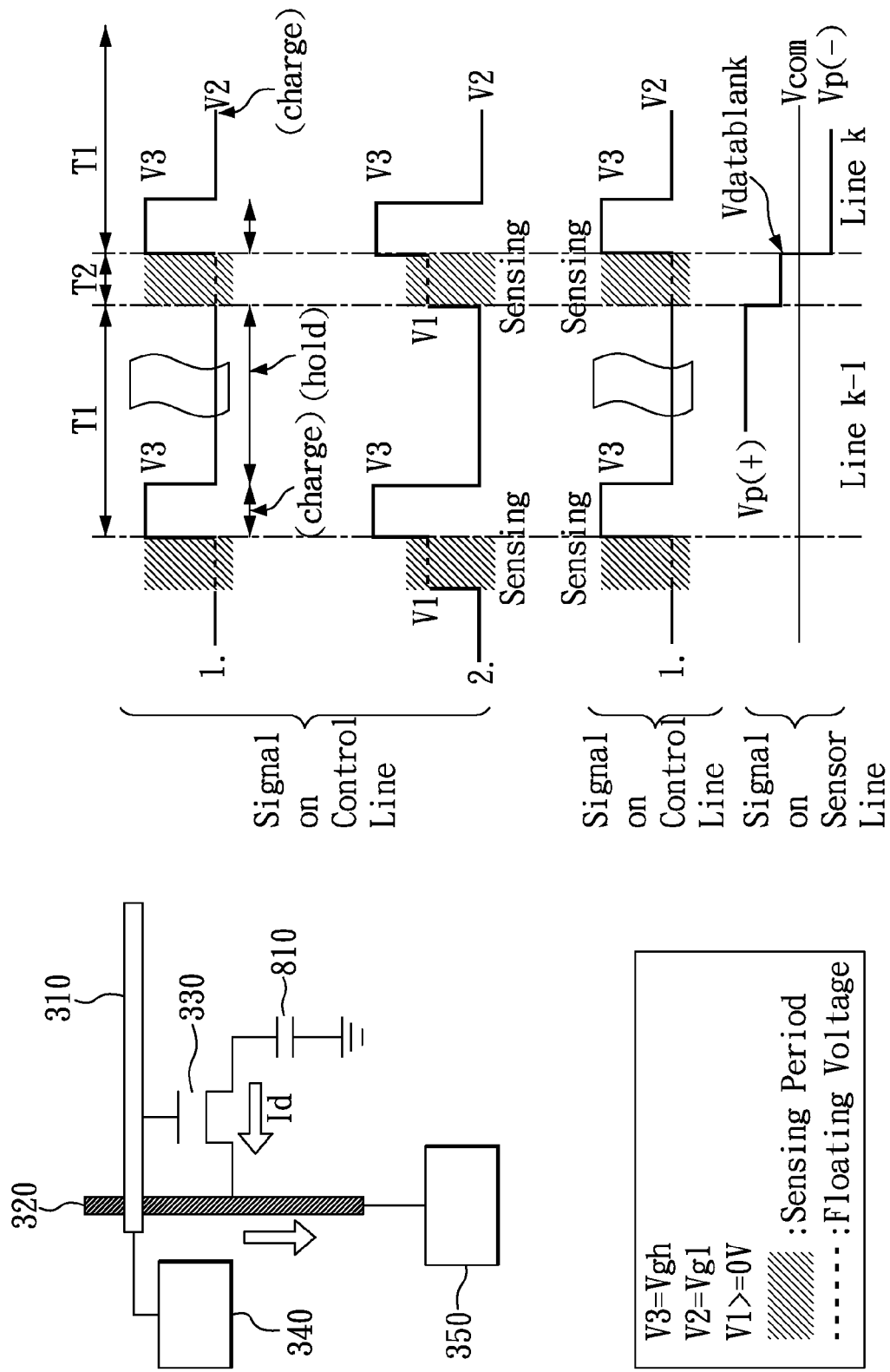
FIG. 5 is a schematic diagram of another embodiment of a thin film transistor according to the disclosure.

FIG. 5 is a schematic diagram of another embodiment of the thin film transistor according to the disclosure. As shown in FIG. 5, each TFT 330 is the switching transistor of the display pixel of the display panel, where the storing capacitor 810 of the corresponding display pixel is used as the power source. The sensor line 320 is also used as the data line 712 of the LCD pixel 710, and the control line 310 is the scan line of the LCD pixel.

As shown in FIG. 5, at the time T1, an image of the line k−1 is displayed, and at the time T2, a touch sensing is performed. In the disclosure, a period of time (T2) between the lines k−1 and k is used as the data blanking time to perform the touch sensing.

The control signal provided by the control unit 340 to the control lines 310 is a signal with floating voltage. The signal with floating voltage is a pull-up voltage V3 in a display line period (the time T1 of line k−1) in order to write the pixel data to be displayed from the sensor line 320 to the corresponding storing capacitor 810 (charge). Next, the corresponding control line 310 is pulled down from the pull-up voltage V3 to the pull-down voltage V2 in order to hold the written pixel data in the storing capacitor 810 at the pull-down voltage V2 (hold) and changes into the floating voltage from the pull-down voltage V2 in the display line period (the time T2 of line k−1).

Alternatively, the signal with floating voltage is a pull-up voltage V3 in a display frame period (the time T1 of line k−1) in order to charge the storing capacitor and display the pixel. Next, the signal is pulled down from the pull-up voltage V3 to the pull-down voltage V2 in order to hold the written pixel data at the pull-down voltage V2 (hold). At the time T2, the signal is pulled up to the pre-charge voltage V1 and changes into a floating voltage from the pre-charge voltage V1. Next, the signal changes into the pre-charge voltage V1 from the floating voltage when switching to a next display frame is performed, and is pulled up to the pull-up voltage V3. The pull-up voltage V3 is a high gate voltage Vgh of the TFT, and the pre-charge signal represents a signal for requesting a current flowing from a data line to a storage capacitor so as to pre-charge a pixel to a suitable voltage level.

As shown in FIG. 5, at the time T1, a driving unit (not shown) outputs a voltage signal Vp(+) to a corresponding sensor line. The voltage signal Vp(+) is a voltage corresponding to the pixel data of a corresponding pixel in a previous frame. At the time T2 where the signal with floating voltage is at the floating voltage, the control unit 340 outputs the first voltage signal Vdata_blank to the corresponding sensor line. The first voltage signal is a data blanking signal Vdata_blank.

There is a relation between the voltage signal Vp(+) and the first voltage signal Vdata_blank as follows:

$$Vp(+)-Vdata\_blank=Vds,$$

where Vds is a predetermined voltage.

The disclosure first measures the TFT 330 with different source and drain voltages (Vds) when being touched or not touched by a finger to thereby record the corresponding source and drain voltage (Vds) as the predetermined voltage Vds when the current Id flowing through the drain and source of the TFT 330 presents the maximum difference. As shown in FIG. 5, when there is a touch sensing to be performed on the k-th line of the n-th frame, the storing capacitor 810 holds the voltage, i.e., the voltage signal Vp(+), of the pixel data of the k-th line of the previous frame (the (n−1)-th frame). In this case, at the time T2, the driving unit outputs a first voltage signal Vdata_blank to the corresponding sensor line 320, such that the source and drain of the TFT 330 has the predetermined voltage Vds, and accordingly the current sensing unit 350 can easily determine whether a finger touches on the TFT 330 since the difference of the current flowing through the source and drain of the TFT 330 is the maximum.

Figure 6:
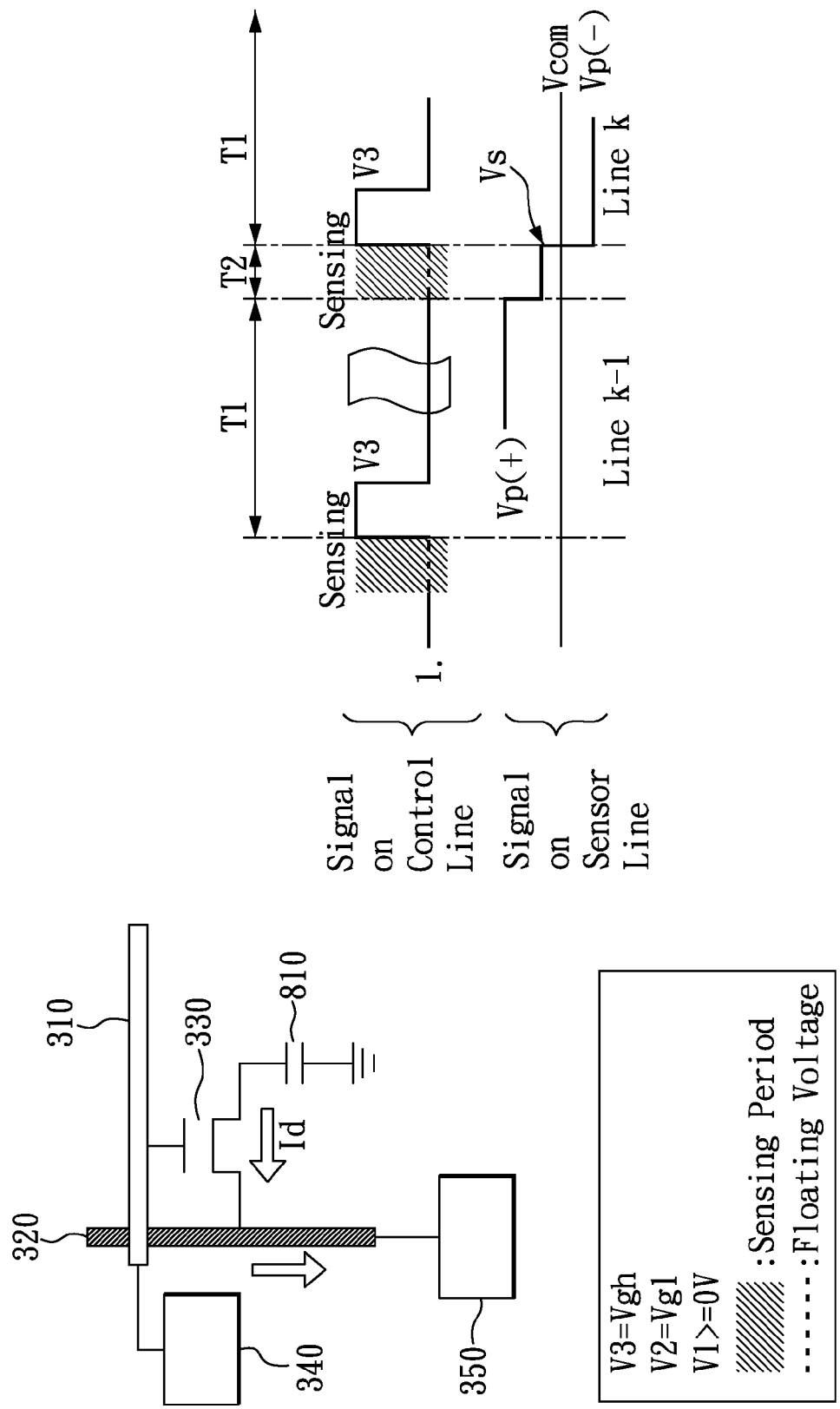
FIG. 6 is a schematic diagram of still another embodiment of a thin film transistor according to the disclosure.

FIG. 6 is a schematic diagram of still another embodiment of the thin film transistor according to the disclosure, which is similar to that of FIG. 5 except that the TFT 330 is measured with different operating threshold voltages Vt to find the data of the current Id flowing through the drain and source of the TFT 330 when being touched or not touched by a finger so as to produce a table of operating threshold voltage Vt and current Id.

When there is a touch sensing to be performed on the k-th line of the n-th frame, the storing capacitor 810 holds the voltage, i.e., the voltage signal Vp(+), of the pixel data of the k-th line in the previous frame (the (n−1)-th frame). In this case, at the time T2, the driving unit IC outputs a first voltage signal Vs to the corresponding sensor line 320, such that the source and drain of the TFT 330 has the operating threshold voltage Vt, and the first voltage signal Vs has a fixed voltage. Accordingly, at the time T2, there is a relation between the voltage signal Vp(+) and the first voltage signal Vs as follows:

$$Vp(+)-Vs=Vt.$$

Thus, the current sensing unit 350 can sense the current Id to produce the table of current Id and operating threshold voltage Vt and, with reference to the table, the control unit 340 can determine whether a finger touches on the TFT 330.

Figure 7:
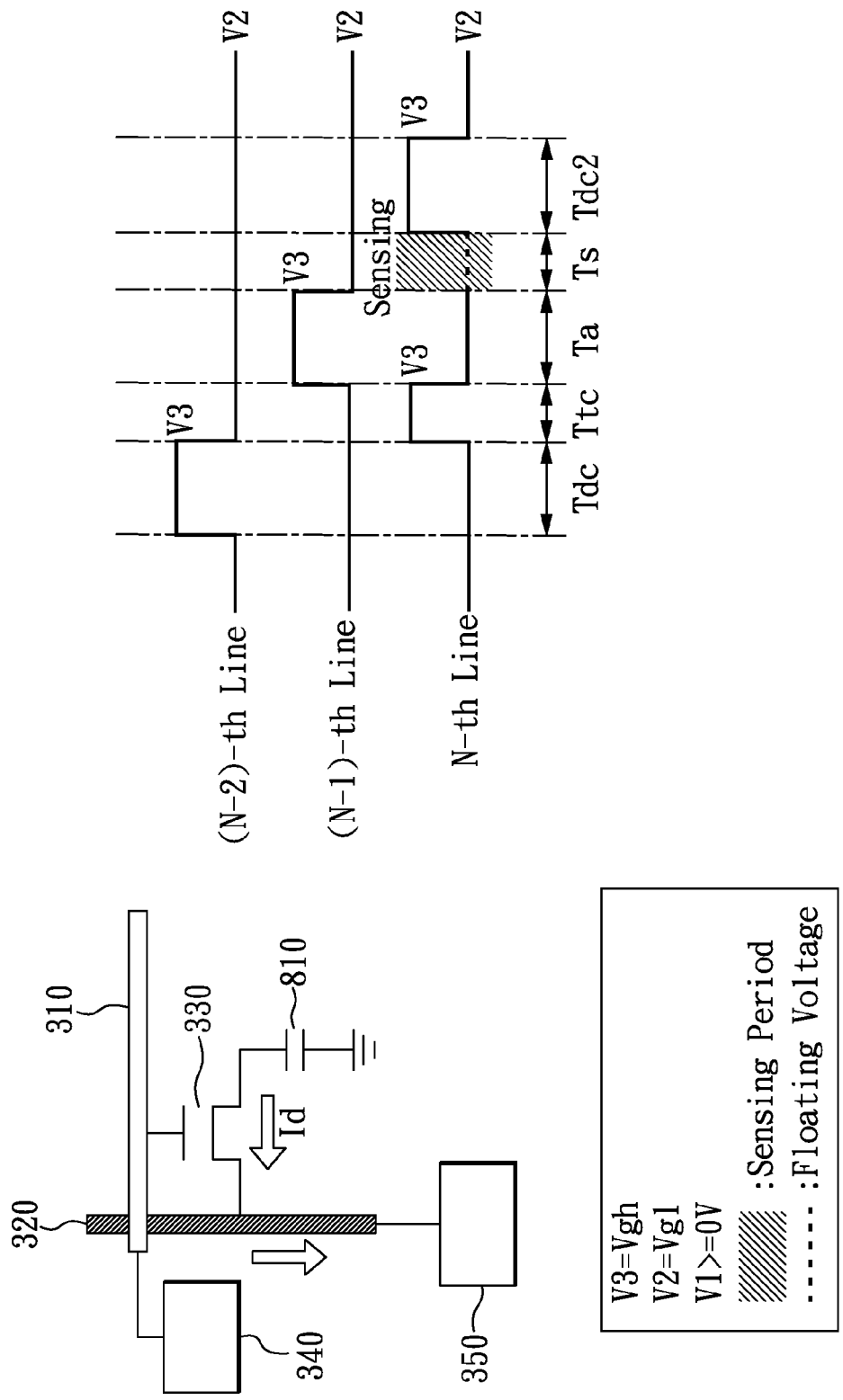
FIG. 7 is a schematic diagram of yet another embodiment of a thin film transistor according to the disclosure.

FIG. 7 is a schematic diagram of yet another embodiment of the thin film transistor according to the disclosure. In FIG. 7, the control signal sequentially provides a pull-up voltage and a pull-down voltage during a display frame period of the (N−1)-th display line and the N-th display line. The sensing period is before the N-th display line changes from the pull-down voltage to the pull-up voltage and after the (N−1)-th display line changes from the pull-up voltage to the pull-down voltage, where N is a natural number greater than two. As shown in FIG. 7, at the time Tdc, the signal with floating voltage corresponding to the (N−2)-th display line has a pull-up voltage V3 in an (N−2)-th display line period to charge the storing capacitor for displaying the pixel. At the time Ttc, the voltage V3 is pulled down to the pull-down voltage V2 to charge the storing capacitor of a pixel of the (N−2)-th display line, where N is an index with a natural number greater than two.

At the time Ttc, the signal with floating voltage corresponding to the (N−2)-th display line has a pull-down voltage V2 while the floating signal corresponding to the N-th display line has a pull-up voltage V3. Namely, there is a period of time Ttc between the (N−2)-th line and the (N−1)-th line that is a data blanking period. Accordingly, the disclosure uses the sensor line 320 to perform a write-in operation on the predetermined voltage Vd in the period Ttc to thereby charge the storing capacitor to the voltage Vd. The storing capacitor corresponds to the TFT 330 of the N-th display line. Namely, the storing capacitor of a pixel of the (N−2)-th display line is charged in the time Tdc for performing an image display, and the storing capacitor of a pixel of the N-th display line is charged in the time Ttc for performing a touch sensing.

At the time Ta, the signal with floating voltage corresponding to the (N−1)-th display line has a pull-up voltage V3 in an (N−1)-th display line period to charge the storing capacitor of a pixel of the (N−1)-th display line for performing an image display. At the time Ts, the signal with floating voltage is pulled down to the pull-down voltage V2, and thus the signal with floating voltage corresponding to the N-th display line changes into a floating voltage for performing a touch sensing. When the touch sensing is performed at the time Ts, the fixed voltage of the sensor line 320 is the first voltage, and the gate of the TFT 330 is maintained at a floating voltage.

At the time Tdc2, the signal with floating voltage corresponding to the N-th display line has the pull-up voltage V3 to charge the storing capacitor of the N-th display line for displaying the pixel of the N-th display line, as described above, so the repeated steps are not described anymore. It is noted that in the period after the time Ttc and in the time Tdc2, the image of the N-th display line cannot be displayed accurately since the storing capacitor of the N-th display line is preset to the voltage Vd. However, the duration is very short, so that the eyes of a user cannot perceive it. In general, the user can correctly see the pictures displayed on the LCD screen. After the time Tdc2, the image of the N-th display line can be displayed accurately.

Figure 8:
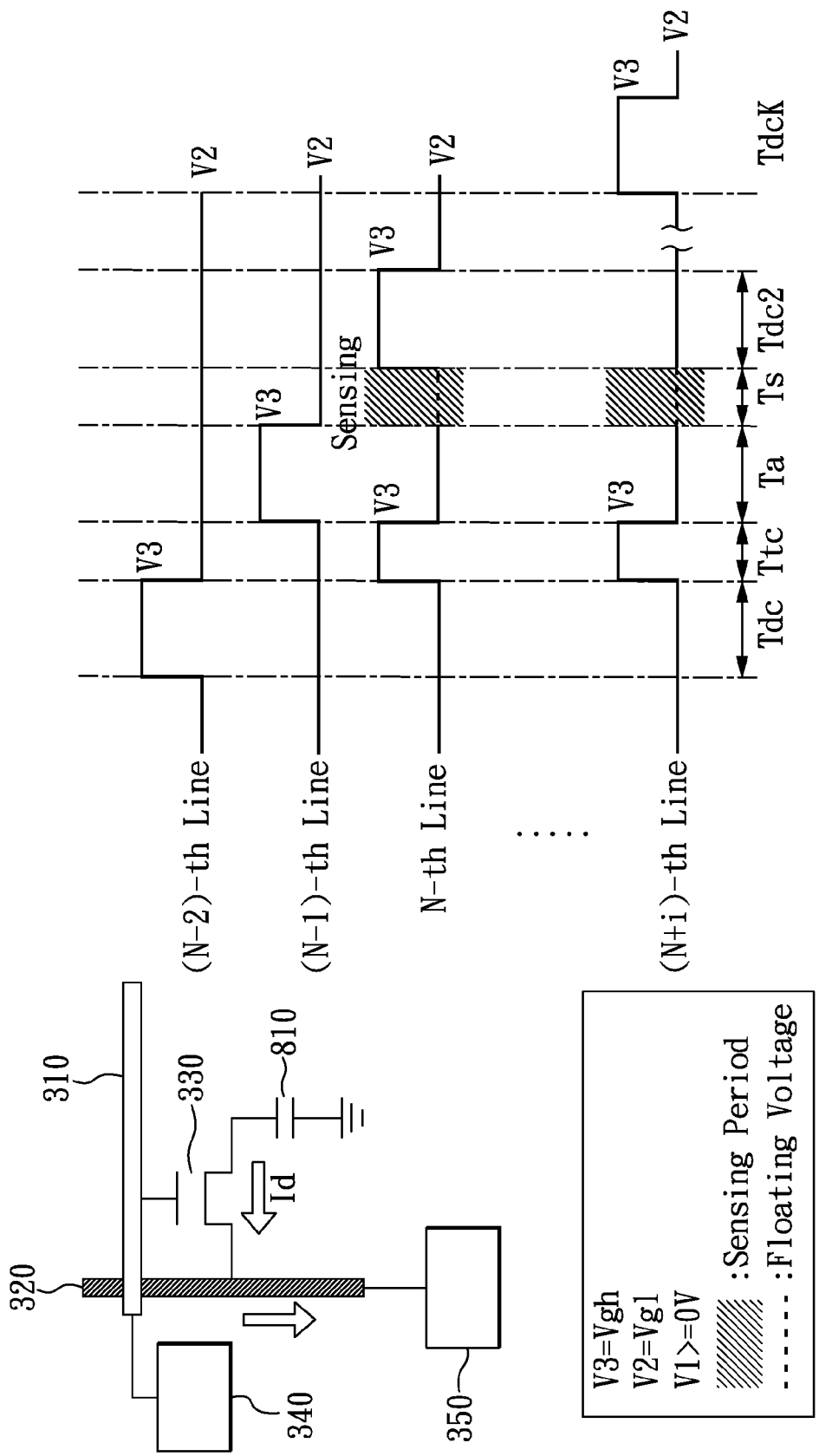
FIG. 8 is a schematic diagram of further another embodiment of a thin film transistor according to the disclosure.

FIG. 8 is a schematic diagram of further embodiment of the thin film transistor according to the disclosure. In FIG. 8, the control signal sequentially provides a pull-up voltage and a pull-down voltage during a display frame period of the (N−1)-th and N-th display lines to the (N+i)-th display line. The sensing period is before the N-th to (N+i)-th display lines change from the pull-down voltage to the pull-up voltage and after the (N−1)-th display line changes from the pull-up voltage to the pull-down voltage. As shown in FIG. 8, at the time Tdc, the signal with floating voltage corresponding to the (N−2)-th display line has a pull-up voltage V3 in the (N−2)-th display line period to charge the storing capacitor for displaying the pixel. At the time Ttc, the voltage V3 is pulled down to the pull-down voltage V2 to charge the storing capacitor of a pixel of the (N−2)-th display line.

At the time Ttc, the signal with floating voltage corresponding to the (N−2)-th display line has the pull-down voltage V2 while the signal with floating voltage corresponding to the N-th display line has the pull-up voltage V3. Namely, there is a period of time Ttc between the (N−2)-th line and the (N−1)-th line that is a data blanking period. Accordingly, the disclosure uses the sensor line 320 to perform a write-in operation on the predetermined voltage Vd in the period Ttc to thereby charge the storing capacitor to the voltage Vd. The storing capacitor corresponds to the TFT 330 of the N-th to (N+i)-th display lines, respectively. Namely, the storing capacitor of a pixel of the (N−2)-th display line is charged in the time Tdc for performing an image display, and the storing capacitor of a pixel of the N-th to (N+i)-th display lines, respectively, is charged in the time Ttc for performing a touch sensing.

At the time Ta, the signal with floating voltage corresponding to the (N−1)-th display line has a pull-up voltage V3 in an (N−1)-th display line period to charge the storing capacitor of a pixel of the (N−1)-th display line for performing an image display. At the time Ts, the signal with floating voltage corresponding to the (N−1)-th display line is pulled down to the pull-down voltage V2, and thus the signal with floating voltage corresponding to the N-th to (N+i)-th display lines changes into a floating voltage for performing a touch sensing. When the touch sensing is performed at the time Ts, the fixed voltage of the sensor line 320 is the first voltage Vs, and the gate of the TFT 330 is maintained at a floating voltage.

This embodiment in FIG. 8 expands the number of sensor lines 320 to (i+1), so as to produce more current than that in FIG. 7 in the touch sensing. At the time Ttc, the voltage of the storing capacitor is reset (or charged to the voltage Vd). At the time Ts, the touch sensing (current detection) is performed. At the time Tdc, writing the display signal is complete.

Figure 9:
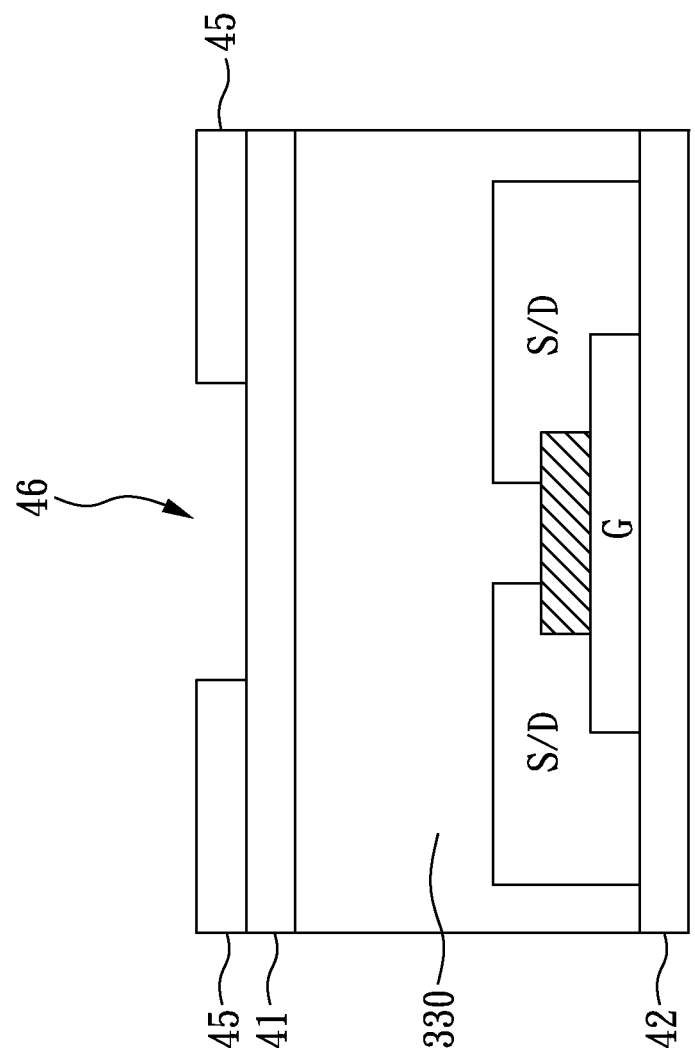
FIG. 9 schematically illustrates another structure of a thin film transistor according to the disclosure.

When the disclosure is applied in an In Panel Switching (IPS) panel, as shown in FIG. 9, an ITO layer 45 on the upper glass substrate 41 is formed to protect the internal electrical field for driving the liquid crystals (LCs) of the panel from interferences. Thus, the ITO layer 45 has an opening 46 formed on each of the TFTs 330 in order to sense touching of a finger. Besides, the opening of the ITO layer (such as common electrode) on the lower glass substrate of the IPS panel can be formed on each of the TFTs 330.

Figure 10:
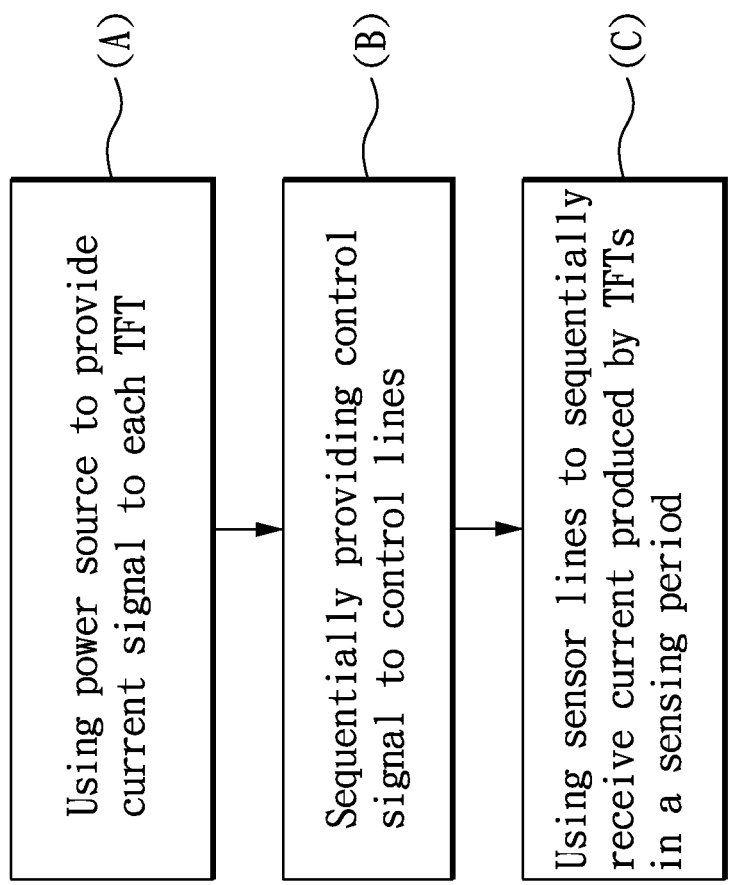
FIG. 10 is a flowchart of a driving method for a thin film transistor touch display device according to the disclosure.

FIG. 10 is a flowchart of a driving method for a TFT touch display device according to the disclosure. Also with reference to the TFT touch display device shown in the aforementioned figures, the TFT touch display device includes a plurality of mutually vertical control lines 310 and sensor lines 320, and a plurality of thin film transistors 330, each being disposed at the intersection of a control lines 310 and a sensor line 320 and each having a gate G connected to the control, a first electrode (source/drain S/D) connected to the sensor line, and a second electrode (source/drain S/D) connected to a power source 331. The method begins by providing a current signal to the second electrode (source/drain S/D) of each TFT 330 by the power source 331 in step (A).

Step (B) sequentially provides a control signal to the control lines 310.

Step (C) uses the sensor lines to sequentially receive the current produced by the TFTs in a sensing period.

In view of the foregoing, it is known that the disclosure uses the TFTs of a typical LCD panel to perform a touch sensing without increasing the hardware cost. The TFTs 330 in the disclosure can co-exist with the TFTs of the typical LCD panel to perform the touch sensing. Therefore, the accuracy of position detection can be effectively increased, and the problem of low touching resolution in the prior art is thus overcome.

Although the present disclosure has been explained in relation to its preferred embodiment, it is to be understood that many other possible modifications and variations can be made without departing from the spirit and scope of the disclosure as hereinafter claimed.

What is claimed is:

1. A TFT touch display device, comprising:
   a plurality of control lines distributed along a first direction;
   a plurality of sensor lines distributed along a second direction substantially perpendicular to the first direction;
   a plurality of TFTs, each TFT being disposed at an intersection of one of the plurality of control line and one of the plurality of sensor line, wherein each TFT is connected to the control line, the sensor line, and a power source providing a fixed voltage, such that the TFT is turned on to generate a back-channel current when there is an object approaching to the TFT;
   a control unit connected to the plurality of control lines for respectively providing a control signal to the plurality of control lines;
   a current sensing unit connected to the plurality of sensor lines for respectively sensing the back-channel current generated by the TFTs in a sensing period; and
   a plurality of display pixels, each display pixel corresponding to one of the plurality of TFTs, each display pixel having a liquid crystal capacitor;
   wherein the control signal is a signal with floating voltage in the sensing period, and the floating voltage represents that there is no voltage applied to a gate of the TFT.

2. The TFT touch display device as claimed in claim 1, wherein each display pixel further includes a scan line, a data line, a switching transistor, and a storing capacitor.

3. The TFT touch display device as claimed in claim 2, wherein the sensor line is the data line of the display pixel.

4. The TFT touch display device as claimed in claim 2, wherein each TFT is the switching transistor of a display pixel, and the power source is the storing capacitor of the display pixel.

5. The TFT touch display device as claimed in claim 1, further comprising an upper substrate and a lower substrate, the TFTs being formed between the upper and lower glass substrates, an indium tin oxide (ITO) layer being formed on the upper glass substrate, the ITO layer being defined with an opening corresponding to each of the TFTs.

6. A driving method for a TFT touch display device having a plurality of mutually perpendicular control lines and sensor lines, a plurality of TFTs and a plurality of display pixels, each display pixel corresponding to one of the plurality of TFTs, each display pixel having a liquid crystal capacitor, wherein each TFT is disposed at an intersection of one of the plurality of control line and one of the plurality of sensor line, and the TFT is connected to the control line, the sensor line, and a power source providing a fixed voltage, the driving method comprising:
   using the power source to provide a current signal to each of the TFTs;
   respectively providing a control signal to the control lines; and
   using the sensor lines to respectively receive a current produced by the TFTs in a sensing period;
   wherein the control signal is a signal with floating voltage in the sensing period, and the floating voltage represents that there is no voltage applied to a gate of the TFT.

7. The driving method as claimed in claim 5, wherein the control signal has a fixed voltage, and the fixed voltage changes into a floating voltage in the sensing period.

8. The driving method as claimed in claim 5, wherein the control signal has a pull-up voltage and a pull-down voltage, and the sensing period is in an interval of the pull-up voltage.

9. The driving method as claimed in claim 5, wherein each of the TFTs is a switching transistor of a display pixel, and a storing capacitor of the display pixel is used as a power source for the TFT.

10. The driving method as claimed in claim 9, wherein the control signal provides a pull-up voltage and a pull-down voltage during a display frame period of a display line, and the sensing period is before the pull-down voltage changes into the pull-up voltage.

11. The driving method as claimed in claim 10, wherein a pre-charge signal is provided before the pull-down voltage changes into the pull-up voltage, the sensing period is in an interval of the pre-charge signal, and the pre-charge signal represents a signal for requesting a current flowing from a data line to a storage capacitor so as to pre-charge a pixel to a suitable voltage level.

12. The driving method as claimed in claim 10, wherein the pull-up voltage is a high gate voltage of a TFT.

13. The driving method as claimed in claim 10, wherein the TFT touch display device further comprises:

a driving unit outputting a first voltage signal to a corresponding sensor line when the control signal outputs the floating voltage to the TFT with the corresponding sensor line, and the first voltage signal is a data blanking signal.

14. The driving method as claimed in claim 13, wherein the first voltage signal has a fixed voltage.

15. The driving method as claimed in claim 9, wherein the control signal sequentially provides a pull-up voltage and a pull-down voltage during a display frame period of (N−1)-th display line and N-th display line, and the sensing period is before the pull-down voltage of the N-th display line changes into the pull-up voltage and after the pull-up voltage of the (N−1)-th display line changes into the pull-down voltage, where N is a natural number greater than two.

16. The driving method as claimed in claim 9, wherein the control signal sequentially provides a pull-up voltage and a pull-down voltage during a display frame period of (N−1)-th and N-th display lines to (N+i)-th display line, and the sensing period is before the pull-down voltage of the N-th to (N+i)-th display lines changes into the pull-up voltage and after the pull-up voltage of the (N−1)-th display line changes into the pull-down voltage, where N is a natural number greater than two, and i represents an index which is a natural number greater than one.

* * * * *